US009544634B2

(12) United States Patent
Lian

(10) Patent No.: US 9,544,634 B2
(45) Date of Patent: Jan. 10, 2017

(54) METHOD, SYSTEM, AND RELATED DEVICE FOR OPERATING DISPLAY DEVICE

(75) Inventor: Ronggang Lian, Shenzhen (CN)

(73) Assignee: ZTE CORPORATION (CN)

( * ) Notice: Subject to any disclaimer, the term of this patent is extended or adjusted under 35 U.S.C. 154(b) by 3 days.

(21) Appl. No.: 14/384,554

(22) PCT Filed: Jun. 18, 2012

(86) PCT No.: PCT/CN2012/077098
§ 371 (c)(1),
(2), (4) Date: Sep. 11, 2014

(87) PCT Pub. No.: WO2013/139090
PCT Pub. Date: Sep. 26, 2013

(65) Prior Publication Data
US 2015/0052555 A1 Feb. 19, 2015

(30) Foreign Application Priority Data
Mar. 23, 2012 (CN) .......................... 2012 1 0080968

(51) Int. Cl.
*G06F 13/00* (2006.01)
*H04N 21/422* (2011.01)
(Continued)

(52) U.S. Cl.
CPC ........ *H04N 21/42221* (2013.01); *G08C 17/02* (2013.01); *G08C 23/04* (2013.01);
(Continued)

(58) Field of Classification Search
CPC ................... H04N 21/42221; H04N 21/42212; H04N 21/4222; H04N 21/422; H04N 21/44218
(Continued)

(56) References Cited

U.S. PATENT DOCUMENTS 6,921,336 B1 * 7/2005 Best ........................ A63F 13/10
463/32
7,526,362 B2 * 4/2009 Kim ....................... G08C 23/04
318/567
(Continued)

FOREIGN PATENT DOCUMENTS

| CN | 201022016 Y | 2/2008 |
| CN | 101546473 A | 9/2009 |
| CN | 101800866 A | 8/2010 |

OTHER PUBLICATIONS

Wikipedia. Light. Web. Jul. 5, 2016. <https://en.wikipedia.org/wiki/Light>.*
(Continued)

*Primary Examiner* — Nasser Goodarzi
*Assistant Examiner* — Michael B Pierorazio
(74) *Attorney, Agent, or Firm* — Plumsea Law Group, LLC

(57) ABSTRACT

A method, system, and related device for operating a display device are disclosed. The method includes: a control device transmitting the directional light to the display device when detecting a key thereof is pressed, and transmitting the collected intensity data of the first reflected light and the key information to a light tracking system; the light tracking system matching a corresponding coordinate position according to the received intensity data of the first reflected light and the known current distance between the control device and the display device, from the preconfigured reflected light intensity corresponding to the distances between the control device and the coordinate positions of various directional points on display device at the distance, then executing a corresponding operation on an area of the display device corresponding to the coordinate position in
(Continued)

conjunction with the key information, and reflecting an operation result on the display device.

18 Claims, 6 Drawing Sheets

(51) Int. Cl.
*G08C 23/04* (2006.01)
*H04N 21/442* (2011.01)
*G08C 17/02* (2006.01)
*H04N 5/44* (2011.01)

(52) U.S. Cl.
CPC ......... *H04N 5/4403* (2013.01); *H04N 21/422* (2013.01); *H04N 21/4222* (2013.01); *H04N 21/42212* (2013.01); *H04N 21/44218* (2013.01); *G08C 2201/51* (2013.01); *G08C 2201/91* (2013.01); *H04N 2005/4416* (2013.01); *H04N 2005/4426* (2013.01)

(58) Field of Classification Search
USPC .......................................................... 725/37
See application file for complete search history.

(56) References Cited

U.S. PATENT DOCUMENTS

| | | | | |
|---|---|---|---|---|
| 7,712,125 B2* | 5/2010 | Herigstad | ............. | H04N 7/163 725/109 |
| 7,931,535 B2* | 4/2011 | Ikeda | ............. | A63F 13/06 345/156 |
| 7,942,745 B2* | 5/2011 | Ikeda | ............. | A63F 13/06 340/12.22 |
| 7,974,535 B2* | 7/2011 | Nakamura | ............. | G08C 23/04 398/106 |
| 8,531,050 B2* | 9/2013 | Barney | ............. | A63F 13/10 290/1 R |
| 8,698,746 B1* | 4/2014 | Merrick | ............. | G06F 3/038 178/19.05 |
| 8,740,708 B2* | 6/2014 | Karacal | ............. | A63F 13/06 463/38 |
| 8,753,205 B2* | 6/2014 | Kando | ............. | A63F 13/10 463/30 |
| 8,830,067 B2* | 9/2014 | Igaki | ............. | G08C 17/02 340/309.16 |
| 8,830,170 B2* | 9/2014 | Kao | ............. | G06F 3/0325 345/156 |
| 9,011,248 B2* | 4/2015 | Ikeda | ............. | A63F 13/06 463/38 |
| 2002/0162120 A1* | 10/2002 | Mitchell | ............. | H04N 7/165 725/135 |
| 2003/0216177 A1* | 11/2003 | Aonuma | ............. | A63F 13/10 463/32 |
| 2005/0210502 A1* | 9/2005 | Flickinger | ............. | G06Q 30/02 725/34 |
| 2007/0022437 A1* | 1/2007 | Gerken | ............. | H04N 7/17318 725/41 |
| 2007/0052177 A1* | 3/2007 | Ikeda | ............. | A63F 13/06 273/317 |
| 2007/0060391 A1* | 3/2007 | Ikeda | ............. | A63F 13/06 463/46 |
| 2007/0124775 A1* | 5/2007 | DaCosta | ............. | H04N 7/17318 725/62 |
| 2008/0082510 A1* | 4/2008 | Wang | ............. | H04H 60/37 |
| 2008/0153593 A1* | 6/2008 | Ikeda | ............. | A63F 13/06 463/37 |
| 2008/0178241 A1* | 7/2008 | Gilboy | ............. | H04N 7/17318 725/114 |
| 2009/0067847 A1* | 3/2009 | Nakamura | ............. | G08C 23/04 398/128 |
| 2009/0163274 A1* | 6/2009 | Kando | ............. | A63F 13/10 463/31 |
| 2009/0249388 A1* | 10/2009 | Seidel | ............. | H04N 21/4126 725/32 |
| 2010/0192173 A1* | 7/2010 | Mizuki | ............. | A63F 13/12 725/25 |
| 2010/0199318 A1* | 8/2010 | Chang | ............. | H04N 7/17318 725/97 |
| 2011/0172016 A1* | 7/2011 | Ikeda | ............. | A63F 13/06 463/37 |
| 2011/0190052 A1* | 8/2011 | Takeda | ............. | A63F 13/02 463/31 |
| 2011/0247042 A1* | 10/2011 | Mallinson | ......... | G06F 17/30026 725/86 |
| 2012/0046767 A1* | 2/2012 | Shimohata | ............. | A63F 13/08 700/91 |
| 2012/0133582 A1* | 5/2012 | Ohsawa | ............. | G06F 3/0325 345/157 |
| 2012/0192222 A1* | 7/2012 | Kumar | ............. | G06Q 30/0251 725/32 |
| 2012/0192228 A1* | 7/2012 | Zito | ............. | G06F 17/30035 725/34 |

OTHER PUBLICATIONS

Wikipedia. Infrared. Web. Jul. 5, 2016. < https://en.wikipedia.org/wiki/Infrared>.*

* cited by examiner

METHOD, SYSTEM, AND RELATED DEVICE FOR OPERATING DISPLAY DEVICE

TECHNICAL FIELD

The patent document relates to the field of communications, and in particular, to a circulator power amplifier circuit and a design method thereof.

BACKGROUND OF THE RELATED ART

With the development of the concept of digital family, like a smart phone, the smart TV also enters the ordinary family and has a tendency to gradually replace the traditional TV. The so-called smart TV is a smart television itself, or a combination of an intelligent set top box and an ordinary TV, like a computer, the smart TV can execute the intelligent operating system and can access to the Internet and provide a variety of local and remote services, and a user can install or uninstall software in person, and it has a human-computer interaction interface with good user experience etc. After the smart TV carries many complicated functions, the user operating interface thereof is no longer tedious, and instead, like a computer or a smart phone, it has a rich presentation style, a complex menu structure and an optional operation mode. Currently, there are primarily three modes for controlling the smart TV as follows:

a first mode is to continue to use the traditional TV remote control device, and a method of re-arranging key positions and increasing corresponding keys is adopted, so that the remote control device can control the human-computer interaction interface of the smart TV. Due to the limited number of keys of the remote control device and limitations resulting from key pressing modes per se, user experience in operating a complex interface of the smart TV like a computer is poor.

a second mode is to adopt a new remote control device with similar navigation functions such as a mouse, a touch-pad, a trackball etc., simulating the operation mode of a computer or a smart phone, enhancing the user experience, but it has a large difference from the traditional operation mode of a user.

a third mode is to operate in a motion detection mode, which must use cameras, motion sensors, infrared sensors, and technologies such as motion capture, image pattern recognition, infrared human body recognition etc., and it is relatively complex to implement.

SUMMARY OF THE INVENTION

The purpose of the patent document is to provide a method, system and related device for operating a display device, to solve the existing defects that the operation mode is complex, the user experience is poor, or the implementation is complex.

In order to solve the above problem, the embodiments of the present invention provide a method for operating a display device, comprising:

a control device emitting directional light to the display device when detecting a key thereof is pressed, and transmitting collected intensity data of first reflected light and key information to a light tracking system;

the light tracking system matching a corresponding coordinate position according to the received intensity data of the first reflected light and known current distance between the control device and the display device, from preconfigured reflected light intensities corresponding to distances between the control device and coordinate positions of various directional points on the display device at the distance, then executing a corresponding operation in an area, corresponding to the coordinate position, of the display device in conjunction with the key information, and reflecting an operation result on the display device.

Alternatively, the light tracking system knowing a current distance between the control device and the display device comprises:

when a certain position is used for the first time, the control device emitting the directional light to the specified points on the display device, and transmitting the collected intensity data of the second reflected light to the light tracking system; and the light tracking system determining the current distance between the control device and the display device according to the received intensity data of the second reflected light and a preconfigured corresponding relationship between the reflected light intensity and the distances between the control device and the specified points.

Alternatively, before the control device emitting the directional light to specified points on the display device, the method further comprises:

the display device displaying positions of the specified points, and prompting the user to use the control device to emit the directional light to the positions where the specified points are located.

Alternatively, there are at least three beams of directional light emitted by the control device to the display device, one beam of directional light is used as aiming light, the remaining are used as auxiliary lights, and light sources of all directional light are separately arranged at a certain angle.

Alternatively, the light tracking system equally divides the display device into multiple regions previously according to information about size and resolution of the display device, and represents each region by using a central point of each region as directional point of the region.

Alternatively, transmitting the collected intensity data of the first reflected light to a light tracking system comprises:

after the control device converts and amplifies the collected first reflected light, outputting data for representing the reflected light intensity.

Alternatively, after the light tracking system receives the intensity data of the first reflected light, validity of the intensity data of the reflected light is firstly judged, and if determining that the data is valid, then subsequent processes are executed.

Correspondingly, the embodiments of the present invention further provide a system for operating a display device, comprising a control device and a light tracking system; wherein, the control device is configured to emit directional light to the display device when detecting a key thereof is pressed, and transmit collected intensity data of first reflected light and key information to the light tracking system; and the light tracking system is configured to match a corresponding coordinate position according to the received intensity data of the first reflected light and known current distance between the control device and the display device, from preconfigured reflected light intensities corresponding to distances between the control device and coordinate positions of various directional points on the display device at the distance, then execute a corresponding operation on an area, corresponding to the coordinate position, of the display device in conjunction with the key information, and reflect an operation result on the display device.

Alternatively, the control device is further configured to emit the directional light to the specified points on the display device when a certain position is used for the first time and transmit collected intensity data of second reflected light to the light tracking system; and the light tracking system knowing the current distance between the control device and the display device specifically comprises:

the light tracking system being configured to determine the current distance between the control device and the display device according to the received intensity data of the second reflected light and a preconfigured corresponding relationship between the reflected light intensity and the distances between the control device and the specified points.

Alternatively, the control device is configured to emit the directional light to the display device by the following mode:

emitting at least three beams of directional light to the display device, wherein, one beam of directional light is used as aiming light, the remaining are used as auxiliary light, and light sources of all directional light are separately arranged at a certain angle.

Alternatively, the light tracking system is configured to equally divide the display device into multiple regions previously according to information about size and resolution of the display device, and represent each region by using a central point of each region as a directional point of the region.

Correspondingly, the embodiments of the present invention further provide a control device for operating a display device, comprising a directional light ranging module, a key module, and a data transmission module; wherein, the key module is configured to receive user key information;

the directional light ranging module includes a directional light emitter and a directional light receiver, and the directional light ranging module is configured to control the directional light emitter to emit directional light and control the directional light receiver to receive a reflected light, after the key module receives the user key information; and the data transmission module is configured to transmit a value of light intensity and the user key information to the light tracking system, wherein, the value of light intensity is obtained after performing analog-digital conversion on the reflected light received by the directional light receiver.

Alternatively, the directional light emitter comprises a light emitting diode, a modulation circuit and an LED driving circuit; wherein, the light emitting diode is connected to the modulation circuit, and the LTE drive circuit is connected to the light emitting diode and the modulation circuit respectively.

Correspondingly, the embodiments of the present invention further provide a light tracking system for operating a display device, comprising a core control module, an automatic configuration module, a data reception module and a data processing module; wherein, the core control module is configured to manage, control and schedule other modules in the light tracking system;

the automatic configuration module is configured to configure reflected light intensities corresponding to distances between the control device and the coordinate positions of various directional points on the display device at various distances;

the data reception module is configured to receive the intensity data of the reflected light transmitted by the control device; and the data processing module is configured to match a corresponding coordinate position according to the intensity data of the reflected light and known current distance between the control device and the display device, from preconfigured reflected light intensities corresponding to distances between the control device and coordinate positions of various directional points on the display device at the distance in the automatic configuration module, then execute a corresponding operation on an area, corresponding to the coordinate position, of the display device in conjunction with the key information, and display an operation result on the display device.

Alternatively, the light tracking system further comprises:

an error analysis module, configured to firstly judge validity of the intensity data of the reflected light after receiving the intensity data of the reflected light, wherein, if determining that the data is valid, then the data processing module executes subsequent processes.

After the scheme of the embodiments of the present invention is used, the user can operate the smart TV like a computer interface in a simple, intuitive and traditional mode, and it is easy for implementation and the cost is relatively low.

PREFERRED EMBODIMENTS OF THE PRESENT INVENTION

Figure 1:
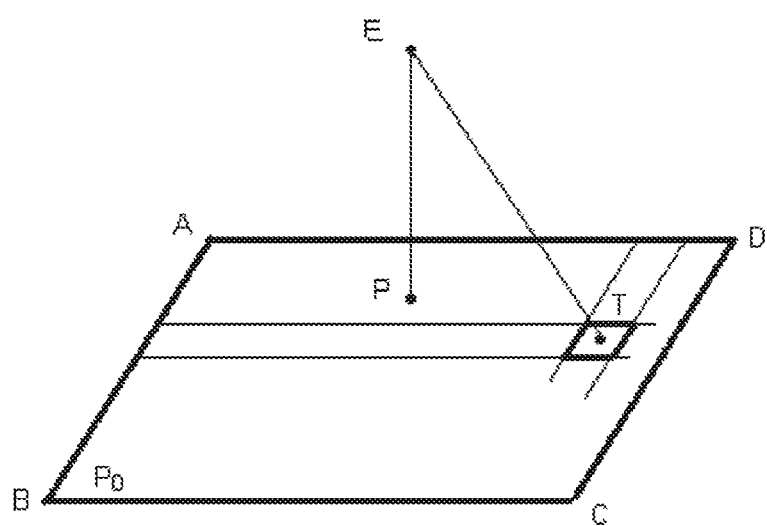
FIG. 1 is a diagram of a light tracking principle according to an embodiment of the present invention.

The embodiments of the present invention will be described in detail in conjunction with accompanying drawings hereinafter. It should be illustrated that, in the case of no conflict, the embodiments of this application and the features in the embodiments could be combined randomly with each other.

The embodiments of the present invention provide a method for operating a display device, which is suitable for various systems including a display device, such as a smart TV etc. The referred apparatus includes two parts, i.e., a control device and a light tracking system.

The embodiments of the present invention measure distances from a remote control device to points on the display device in a directional direction of the remote control device of a user based on the light reflection energy principle, and calculate positions of points on the display device, thus judging an intention of the user and executing subsequent human-computer interaction operations. The control device may be any remote control device, mobile phone or equivalent device with or equipped with a light ranging module, keys and data transmission capabilities; and the light tracking system may be set in a mobile phone, a tablet, a computer, a set top box, a TV box, a server or a cloud server.

The above system for operating a display device may be arranged for use in an ordinary family, or can also be arranged in any place where a TV is required to be used.

In the method for operating a display device in the embodiments, directing to the display device or a menu, a control element, a button and others of the display device is done through infrared or visible light, and the reflected light is collected, and coordinates of the directed display device are obtained by using the optical ranging principle and applying vector algebra and calculus, and corresponding functions are executed according to the coordinates, thereby achieving the purpose of controlling a smart TV.

When a user uses a control device to direct to a certain region on the display device and presses a certain key on the control device, the control device emits the directional light (for example, infrared light or laser, etc.) and receives the light reflected from a surface of the display device, and an analog voltage is output by measuring the energy of the reflected light, i.e., converting the light intensity into a current and amplifying the current, and a value capable of reflecting the reflected light intensity is obtained through Analog-Digital (A/D) conversion. Since the intensity of the received reflected light varies with the distance to the reflective object, if the value is large, it represents a strong intensity of the reflected light, i.e., the distance from the control device to a certain region on the surface of the display device in a direction of the emitted light is short; and if the value is small, it represents a weak intensity of the reflected light, i.e., the distance from the control device to a certain region on the surface of the display device in a direction of the emitted light is long. Thereby, the distance from the control device to a certain region on the surface of the display device in a direction of the emitted light can be calculated.

The display device is manually divided into a number of regions equally, and an area of each region is small enough. An intersection point of diagonal lines of each region, i.e., a central point is used to substitute all points in the region approximately, and the position where the control device is located is also approximated to a point E in the space. That is, a point E(x,y,z) external to a plane P0 where the display device is located is known, if a distance from E to the plane P0 (i.e., a distance |EP| from E to a projection point P of E on the P0) and specifications (a height |AB| and a length |AD|) of the display device are known, a distance |ET| from E to any point T on P0 can be calculated, as shown in FIG. 1. Thus, the coordinate of a central point of each region on the display device and each |ET| value generate a corresponding relationship, and the coordinate value of a point on the surface of the display device in a direction of the emitted light can be obtained by comparing the value of distance calculated from the intensity of the reflected light with these values. Thereby, it can be known that the control device directs to which region on the display device at a certain moment; and in order to obtain more accurate coordinate values, the region may be manually divided into smaller parts, or each region can be subdivided infinitely by using the differential theory, to calculate values of distance from E to all points in a range of ABCD on the P0 plane. Since a minimum display unit on the display device is a pixel, the size of the region can be divided into a unit of pixel minimally, because even if the accurate corresponding relationship between coordinate values of a point smaller than a pixel and the value of |ET| distance can be calculated, it is meaningless.

Since the display device generally has a rectangular symmetric structure, the coordinates of the points on the display device do not correspond to |ET| one by one, and there may be a condition that at least two points on the same display device correspond to one |ET| at the same time. In order to distinguish them, when a key on the control device is pressed, it needs to emit at least three beams of emitted lights at the same time, and source emissive positions of various emitted light are separated at a certain angle. For example, the source emissive positions are set in a form like the character "品", and one beam of light thereof is used as aiming light, and remaining are used as auxiliary lights. Since different vector directions result in different distances to the surface of the display device in a direction of the emitted light, the real vector direction of the aiming light can be determined by comparing energy intensities of the reflected lights of various emitted light, so as to achieve the purpose of distinguishing coordinate points on the display device; and in addition, the multiple emissive light sources can also be set to effectively reduce a dead zone and decrease an error;

In addition, an immediate result in the above each step can further be corrected according to previous error analysis, to obtain relatively accurate coordinate positions finally;

the light tracking system matches a corresponding coordinate position according to the received intensity data of the first reflected light and the known current distance between the control device and the display device, from the preconfigured reflected light intensity corresponding to the distances between the control device and the coordinate positions of various directional points on display device at the distance, then executes the corresponding operation on the area of the display device corresponding to the coordinate position in conjunction with the key information, and reflects an operation result on the display device. That is, after obtaining coordinate values of the display device by using the above method, an intention of the user or a menu, a control element, and a button desired to be operated are judged, then a next operation is executed, and a result is presented on the display device; thereby, one human-computer interaction process is completed.

Wherein, the light tracking system can know a current distance between the control device and the display device by the following way, which specifically comprises:

when a certain position is used for the first time, the control device emitting the directional light to the specified points on the display device, and transmitting the collected intensity data of the second reflected light to the light tracking system; and the light tracking system determining the current distance between the control device and the display device according to the received intensity data of the second reflected light and preconfigured corresponding relationship between the reflected light intensity and the distances between the control device and the specified points.

Figure 2:
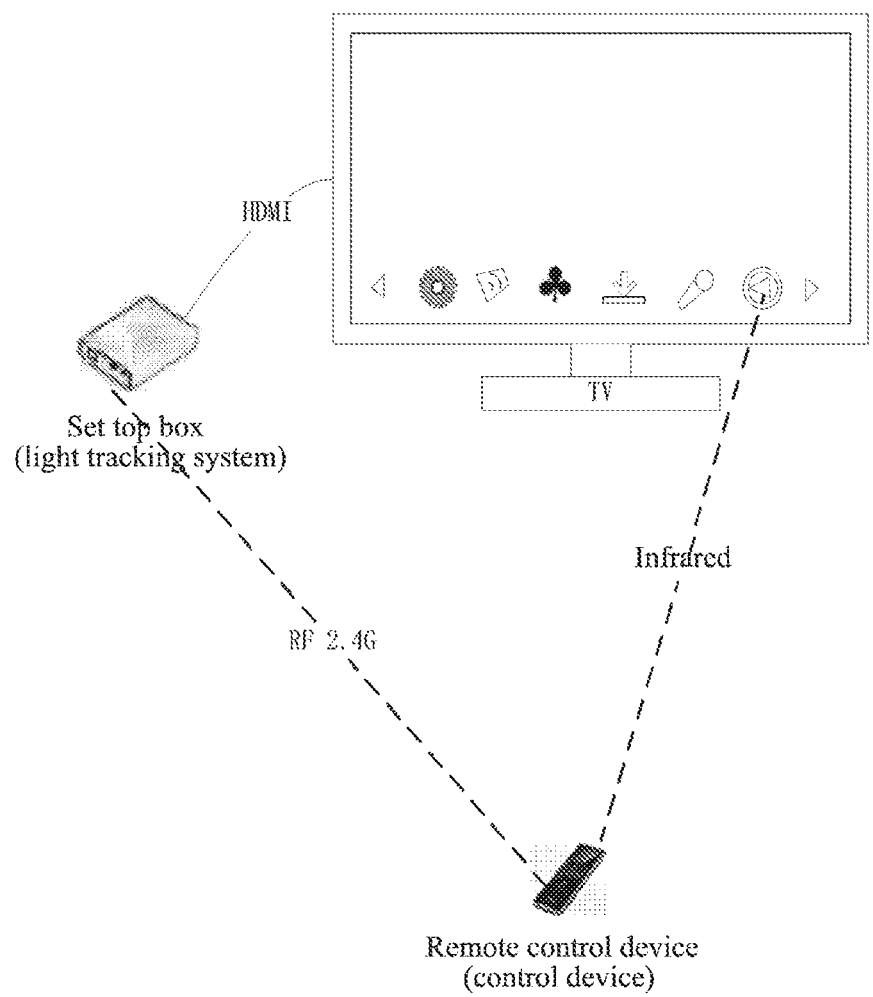
FIG. 2 is a diagram of an application scenario based on a remote control device and a set top box according to an embodiment of the present invention.

The embodiments of the present invention further provide a system for operating a display device, comprising a control device and a light tracking system; wherein, the control device emits infrared or visible light with excellent directional performance according to the grasp orientation of a user, converts the received reflected light into a voltage value, and passes it to the light tracking system for processing; and the control device includes a directional light ranging module, a key module, and a data transmission module; wherein, the directional light ranging module includes multiple sets of infrared or visible light emitter (or a set of emitter and a light splitting apparatus) and multiple sets of infrared or visible light receiver; and the data transmission module transmits an analog-digital converted light intensity value and the key value to the light tracking system for processing;

the light tracking system processes the data from the ranging module according to the method, to obtain coordinates of the display device which the user directs to, and transmits the key value and the coordinates of the display device to a human-computer interaction program of a smart TV, and the latter judges the intention of the user or a desired operation, to continue to perform the next step of operation, presenting the result on the display device; and the light tracking system includes a core module, an automatic configuration module, a data reception module, a data processing module, an error analysis module and a human-computer interaction program interface; wherein, the core module manages, controls and schedules other modules;

the automatic configuration module configures the required various parameters according to a automatically detected or preset script when the data processing module and the error analysis module perform calculation;

the data reception module receives the data from the control device; and the data processing module calculates coordinate values on the display device according to the method;

the error analysis module judges validity of the data, and corrects an immediate calculation result;

the human-computer interaction program interface transmits a final result and the key value to the human-computer interaction application program;

As shown in FIG. 2, an implementation is that after a user uses the above control device, i.e., a remote control device to direct to a certain region of a display device of a smart TV, the remote control device transmits the collected reflected light to the set top box, and a light tracking system in the set top box calculates coordinates of the display device, and presents a result on the display device of the TV. Data transmission between the remote control device and the set top box can use Bluetooth, RF 2.4 GHz or other equivalent wireless media protocols; and a High Definition Multimedia Interface (HDMI) or equivalent interface connection can be used between the set top box and the TV.

Figure 3:
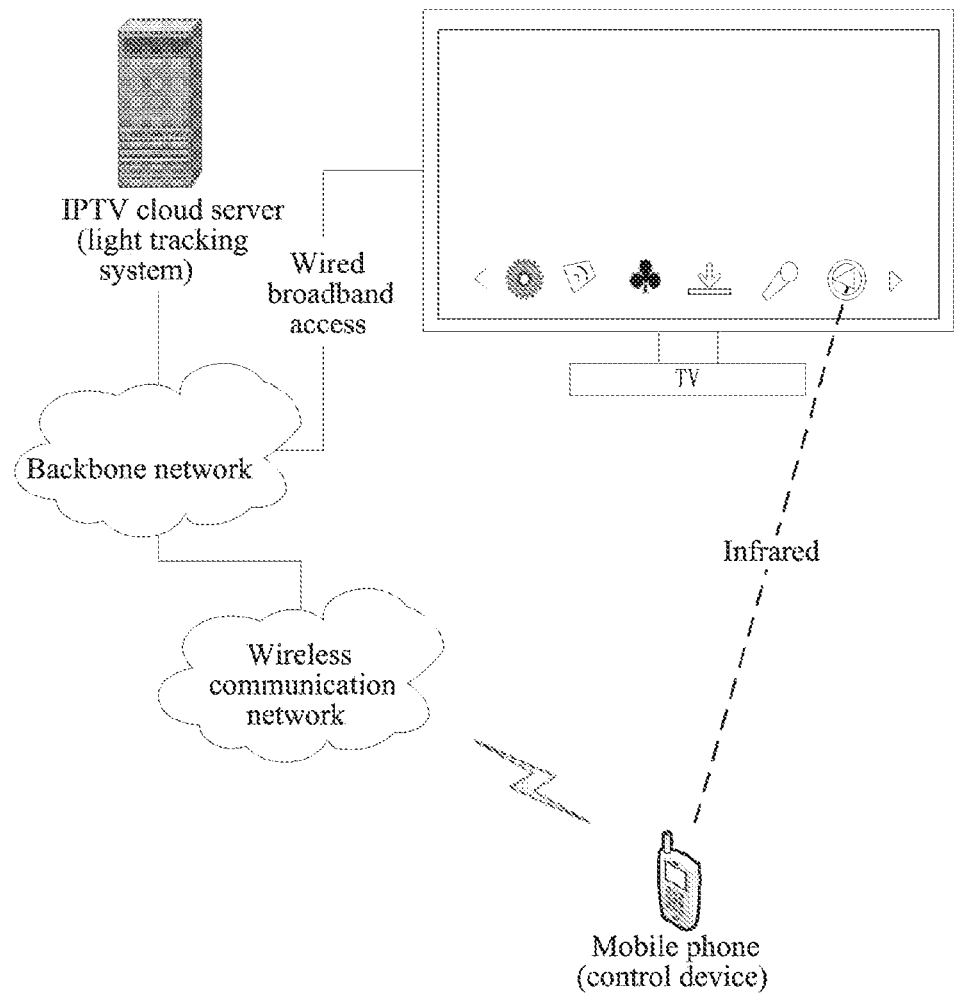
FIG. 3 is a diagram of an application scenario based on a mobile phone and a cloud server according to an embodiment of the present invention.

As shown in FIG. 3, another implementation is that after a user uses the control device, i.e., a mobile phone to direct to a certain region of a display device of a smart TV, the mobile phone transmits the collected data of the reflected light to a cloud server of the IPTV through a wireless network, and the light tracking system in the cloud server calculates the coordinates of the display device, and performs a corresponding operation on the position of the coordinates on the display device in conjunction with the key information of the user, and reflects the operation result on the display device of a TV of the user.

Figure 4:
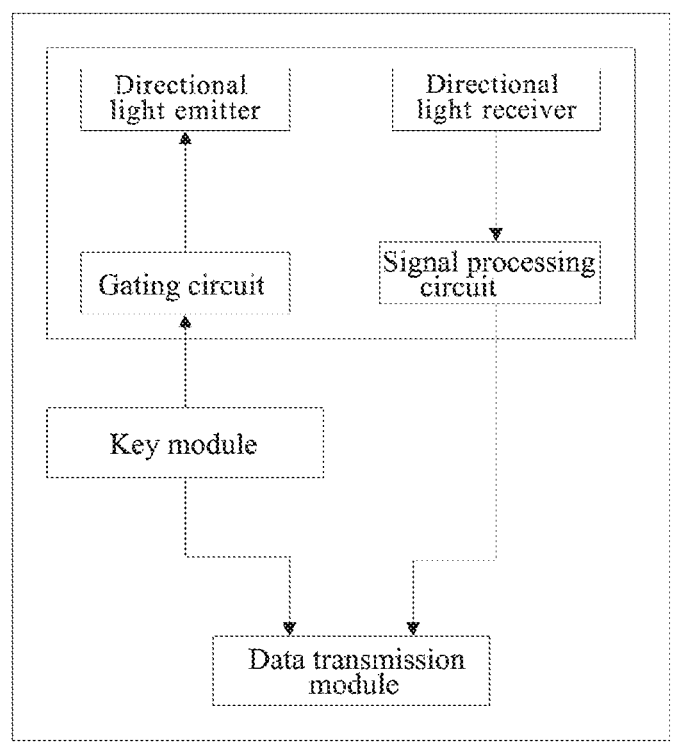
FIG. 4 is a system structural diagram of a control device according to an embodiment of the present invention.

As shown in FIG. 4, the control device includes a directional light ranging module, a key module, and a data transmission module;

the directional light ranging module includes at least three sets of light emitting diodes and photosensitive triodes, an LED driving circuit, a modulation circuit, a gating circuit, a preamplifier circuit and a signal processing circuit, wherein, the light emitting diodes are connected to the modulation circuit, the LTE driving circuit is connected to the light emitting diodes and the modulation circuit respectively, all of which constitute a directional light emitter;

the gating circuit and the key module cooperate to control emission of the light, and the keypad also responds to other key events of the user;

the photosensitive triodes and the preamplifier circuit constitute a directional light receiver;

the signal processing circuit primarily completes Analog/Digital (A/D) conversion of the light intensity; and the data transmission module is used to transmits the A/D converted light intensity value and the key value to the light tracking system for processing.

Figure 5:
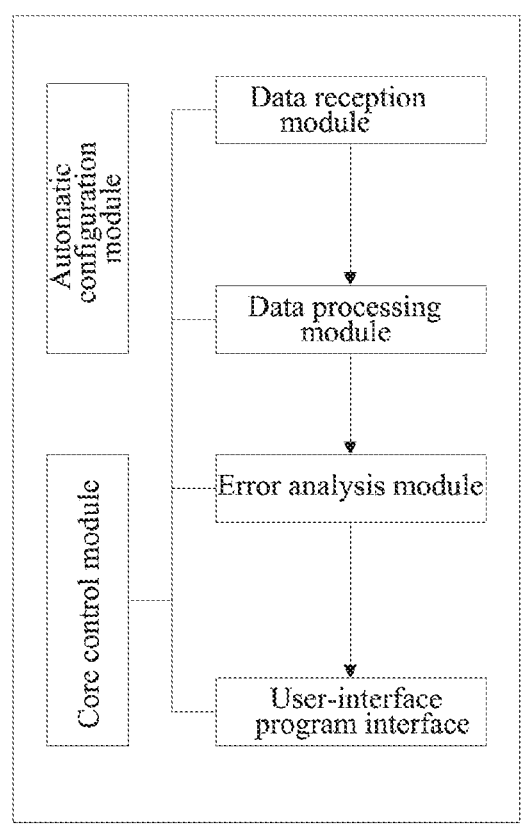
FIG. 5 is a modular diagram of a light tracking system according to an embodiment of the present invention.

As shown in FIG. 5, the light tracking system includes a core control module, an automatic configuration module, a data reception module, a data processing module, an error analysis module and a user-interface program interface, wherein, the core control module is configured to manage, control, schedule other modules and interfaces in the light tracking system;

the automatic configuration module is configured to configure the required various parameters, such as length and width specifications of a display device of a TV, the sizes of different regions divided according to resolutions and so on, according to a preset script or an automatic detection result when the data processing module and the error analysis module perform calculation;

the data reception module is configured to receive data transmitted by the control device;

the data processing module is configured to calculate coordinate values on the display device according to a specific method, and completes a light tracking and processing flow;

the error analysis module is configured to judge validity of the data in a process of operation of the data processing module, and correct an immediate calculation result. If it can be determined through logic judgment that the data is valid, for example, the value of collected data is too large or too small, and there is a negative value in the immediate calculation result, and a range of coordinate values exceeds a range of the display device of the TV etc., it can be judged that the data is invalid; and the user-interface program interface is configured to transmit a final result and key value to the user-interface application program.

Figure 6:
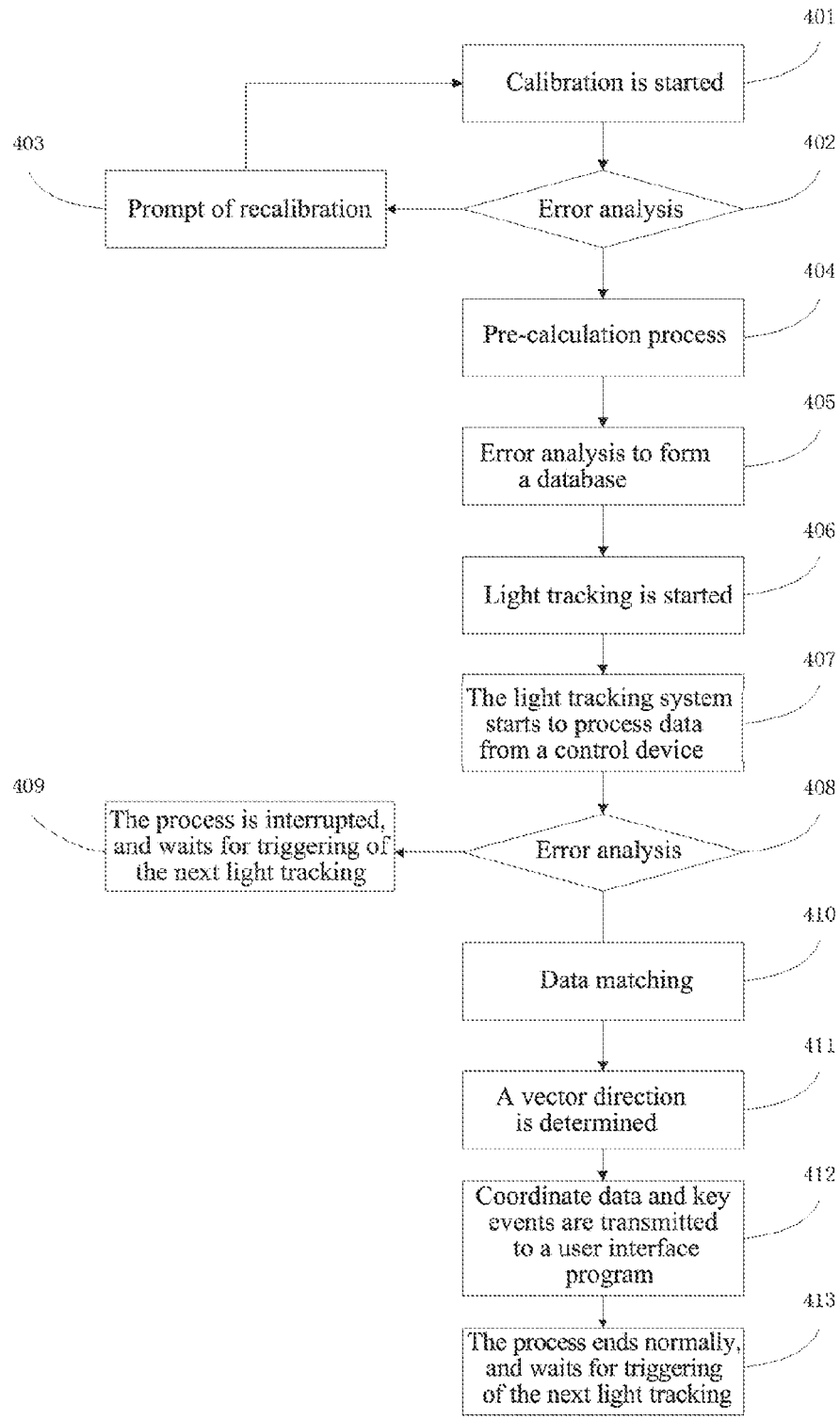
FIG. 6 is a flowchart of a method for controlling a smart TV according to an embodiment of the present invention.

As shown in FIG. 6, a method for controlling a smart TV in the present embodiment specifically comprises the following steps:

in step 401, a calibration process is started, enabling a control device to perpendicularly direct to any point on a display device of the TV and emit the light, receive the reflected light, convert the reflected light into a digital signal, and transmit the data to a light tracking system;

in step 402, error analysis is performed on the data, and if multiple calibration processes are performed continuously, statistical calculation is performed on the data of the received reflected light for the same coordinate point to obtain a statistical value;

in step 403, if it is judged that the data is invalid and there is other interference such as a blind point and so on in the step 402, the processing flow is terminated, and a message is sent to the user interface and a user is prompted on the display device to perform recalibration;

in step 404, if the data is valid, a pre-calculation process is started, a distance from the control device to a plane where the display device of the TV is located is calculated according to a result in the step 402, and a distance of light from a position of the current control device to all regions of the display device of the TV is calculated in conjunction with the detected or automatically configured specifications of the display device of the TV and region division parameters of the display device etc.;

in step 405, an error of the result in the step 404 is analyzed and corrected to form a data base, in which a corresponding relationship table between a distance (length) of light from the position of the current control device to all regions of the display device of the TV and coordinate values represented by all regions of the display device of the TV;

in step 406, after the calibration and pre-calculation processes are completed, a light tracking process is started in real time, and the control device is utilized to direct to any region on the display device of the TV, and aiming light and auxiliary lights are emitted when a certain key is pressed on the control device;

in step 407, the reflected light is received and is converted into a digital signal, and data is transmitted to the light tracking system, to obtain a distance from the control device to a directional point on the display device of the TV and distances to auxiliary points on the display device; wherein, the directional point is a coordinate point of the aiming light on the display device, and the auxiliary points are coordinate points of the auxiliary lights on the display device;

in step 408, an error of the result in the step 407 is analyzed and corrected;

in step 409, if it is judged that there is a false signal such as noise and so on in the step 408, the present process is interrupted;

in step 410, completely matched or similarly matched sets of region coordinates of the display device are found by comparing the result in the step 408, i.e., distances of directional points, and data in a database generated by pre-calculation in the step 405;

in step 411, the sets of coordinates obtained in the step 410 are selected with the aid of distances of the auxiliary points to determine a real directional vector direction, that is, determining uniquely corresponding coordinates of the display device;

in step 412, coordinates of the display device and key events of the control device are transmitted to a user interface;

in step 413, the process ends normally.

A person having ordinary skill in the art can understand that all or a part of steps in the above method can be implemented by programs instructing related hardware, which can be stored in a computer readable storage medium, such as a read-only memory, a disk or a CD etc. Alternatively, all or a part of steps in the above embodiments can also be implemented by one or more integrated circuits.

Accordingly, each module/unit in the above embodiments can be implemented in the form of hardware, or can also be implemented in the form of software functional module. The patent document is not limited to any particular form of a combination of hardware and software.

The above description is only the preferred embodiments of the present invention and is not intended to limit the protection scope of the patent document. According to the inventive contents of the patent document, the patent document can further have a plurality of other embodiments. Without departing from the spirit and substance of the patent document, those skilled in the art can make various corresponding changes and variations according to the patent document. Any modification, equivalent replacement or the improvement and so on without departing from the spirit and principle of the patent document should be included in the protection scope of the patent document

INDUSTRIAL APPLICABILITY

With the embodiments of the present invention, a user can conveniently and intuitively operate a smart TV, and execute various operations on the TV, including but not limited to a main menu operation, an application program operation, game control, drawing etc.

What is claimed is:

1. A method for operating a display device, comprising:
configuring a table of various data of intensity of reflected light on a light tracking system when a control device is at various different distances from the display device, wherein said data of intensity of reflected light in said table correspond to coordinate positions on the display device, and said reflected light corresponds to a directional light that is sent from the control device to a control area on the display device and reflected from the display device;
the control device emitting the directional light to the display device when detecting a key thereof is pressed and the directional light being reflected from the display device and forming a first reflected light;
the control device receiving said first reflected light and collecting data of intensity of said first reflected light and transmitting the data of intensity of the first reflected light and information of the pressed key to the light tracking system;
the light tracking system matching a corresponding coordinate position on the display device from said table of various data of intensity of reflected light according to the data of intensity of said first reflected light and a current distance between the control device and the display device, executing a corresponding operation in an area corresponding to the coordinate position of the display device in conjunction with the information of the pressed key, and reflecting an operation result on the display device.

2. The method according to claim 1, further comprising the light tracking system determining the current distance between the control device and the display device, wherein determining the current distance comprises:
when a position of the control device is used for the first time, the control device emitting the directional light to a specified area on the display device, and transmitting collected data of intensity of a second reflected light to the light tracking system;
the light tracking system determining the current distance between the control device and the display device according to the received data of intensity of the second reflected light and a preconfigured corresponding relationship between the intensity of the reflected light and a distance between the control device and the specified area.

3. The method according to claim 2, wherein, before the control device emitting the directional light to the specified area on the display device, the method further comprises:
the display device displaying a position of the specified area, and prompting a user to use the control device to emit the directional light to the position where the specified area is located.

4. The method according to claim 3, wherein, there are at least three beams of directional light emitted by the control device to the display device, wherein one beam of directional light is used as aiming light and the other two beams of the directional light are used as auxiliary light, and light sources of all the three beams of the directional light are separately arranged at a certain angle.

5. The method according to claim 2, wherein, there are at least three beams of directional light emitted by the control device to the display device, wherein one beam of directional light is used as aiming light and the other two beams of the directional light are used as auxiliary light, and light sources of all the three beams of the directional light are separately arranged at a certain angle.

6. The method according to claim 1, wherein, there are at least three beams of the directional light emitted by the control device to the display device, wherein one beam of the directional light is used as aiming light and the other two beams of the directional light are used as auxiliary light, and light sources of all the three beams of the directional light are separately arranged at a certain angle.

7. The method according to claim 1, further comprising:
the light tracking system equally dividing the display device into multiple areas according to information about size and resolution of the display device, and representing each area by using a central point of each area as a directional point of the area.

8. The method according to claim 1, wherein,
transmitting the collected data of intensity of the first reflected light to the light tracking system comprises:
after the control device converts and amplifies the collected first reflected light, outputting data for representing the reflected light intensity.

9. The method according to claim 1, further comprising:
after the light tracking system receives the data of intensity of the first reflected light, judging validity of the data of intensity of the first reflected light, and
when determining that the data is valid, executing subsequent processes.

10. A system for operating a display device, comprising a control device and a light tracking system; wherein,
the control device is configured to
emit directional light to the display device when detecting a key thereof is pressed, the directional light being reflected from the display device and forming a first reflected light,
receive said first reflected light and collect data of intensity of said first reflected light, and
transmit the data of intensity of the first reflected light and information of the pressed key to the light tracking system;
the light tracking system is configured to:
preconfigure a table of various data of intensity of reflected light on the light tracking system when a control device is at various different distances from the display device, wherein said data of intensity of reflected light in said table correspond to coordinate positions on the display device, and said reflected light corresponds to a directional light that is sent from the control device to a control area on the display device and reflected from the display device;
match a corresponding coordinate position on the display device from said preconfigured table of various data of intensity of reflected light according to the data of intensity of said first reflected light and a current distance between the control device and the display device; and
execute a corresponding operation on an area corresponding to the coordinate position of the display device in conjunction with the information of the pressed key, and reflect an operation result on the display device.

11. The system according to claim 10, wherein,
the control device is further configured to emit the directional light to a specified area on the display device when a position of the control device is used for the first time, and transmit collected data of intensity of a second reflected light to the light tracking system;
the light tracking system is configured to determine the current distance between the control device and the display device by:
determining the current distance between the control device and the display device according to the received data of intensity of the second reflected light and a preconfigured corresponding relationship between the intensity of reflected light and distance between the control device and the specified area.

12. The system according to claim 11, wherein, the control device is configured to emit the directional light to the display device by:
emitting at least three beams of directional light to the display device, wherein one beam of directional light is used as aiming light and other two beams of the directional light are used as auxiliary light, and light sources of all the three beams of the directional light are separately arranged at a certain angle.

13. The system according to claim 10, wherein, the control device is configured to emit the directional light to the display device by:
emitting at least three beams of directional light to the display device, wherein one beam of directional light is used as aiming light and two other beams of directional light are used as auxiliary light, and light sources of all the three beams of directional light are separately arranged at a certain angle.

14. The system according to claim 10, wherein,
the light tracking system is further configured to equally divide the display device into multiple areas according to information about size and resolution of the display device, and represent each area by using a central point of each area as a directional point of the area.

15. The system according to claim 10, wherein the control device comprises a directional light ranging module, a key module, and a data transmission module; wherein,
the key module is configured to receive information of a pressed key;
the directional light ranging module includes a directional light emitter and a directional light receiver, and the directional light ranging module is configured to control the directional light emitter to emit directional light and control the directional light receiver to receive reflected light, after the key module receives the information of the pressed key; and
the data transmission module is configured to transmit data of intensity of the reflected light and the information of the pressed key to the light tracking system, wherein, the data of intensity of the reflected light is obtained after performing analog-digital conversion on the reflected light received by the directional light receiver.

16. The system according to claim 15, wherein, the directional light emitter comprises a light emitting diode, a modulation circuit and an LED driving circuit;
wherein, the light emitting diode is connected to the modulation circuit, and the LED driving circuit is connected to the light emitting diode and the modulation circuit respectively.

17. A light tracking system for operating a display device, comprising a processor and a storage device for storing computer executable instructions, wherein,
a core control module, performed by the processor, is configured to manage, control and schedule other modules in the light tracking system;
an automatic configuration module, performed by the processor, is configured to configure a table of various data of intensity of reflected light on the light tracking system when a control device is at various different distances from the display device, wherein said data of intensity of reflected light in said table correspond to coordinate positions on the display device, and the reflected light corresponds to a directional light that is sent from the control device to a control area on the display device and reflected from the display device; wherein the control device emits the directional light to the display device when detecting a key thereof is pressed and the directional light is reflected from the display device and forms a first reflected light, the control device receives said first reflected light and collects data of intensity of said first reflected light and transmits the data of intensity of the first reflected light and information of the pressed key to the light tracking system;

a data reception module, performed by the processor, is configured to receive said data of intensity of said first reflected light and information of the pressed key transmitted by the control device; and a data processing module, performed by the processor, is configured to match a corresponding coordinate position on the display device from said table of various data of intensity of reflected light according to the data of intensity of said first reflected light and a current distance between the control device and the display device, execute a corresponding operation on an area corresponding to the coordinate position of the display device in conjunction with information of the pressed key on the control device, and display an operation result on the display device.

18. The light tracking system according to claim 17, further comprising:

an error analysis module, performed by the processor, is configured to judge validity of the data of intensity of the first reflected light after receiving the data of intensity of the first reflected light, wherein, when determining that the data is valid, the data processing module executes subsequent processes.

\* \* \* \* \*